United States Patent
Brogle et al.

(10) Patent No.: US 6,374,192 B1
(45) Date of Patent: Apr. 16, 2002

(54) APPARATUS AND METHOD FOR AUTOMATIC CORRECTION OF POLE-ZERO ERROR IN A SPECTROSCOPY SYSTEM

(75) Inventors: Richard J. Brogle; Steven W. Pauly, both of Plano, TX (US)

(73) Assignee: Constellation Technology Corp., Largo, FL (US)

( * ) Notice: Subject to any disclaimer, the term of this patent is extended or adjusted under 35 U.S.C. 154(b) by 0 days.

(21) Appl. No.: 09/423,138

(22) PCT Filed: Sep. 23, 1999

(86) PCT No.: PCT/US99/21791

§ 371 Date: Nov. 5, 1999

§ 102(e) Date: Nov. 5, 1999

(87) PCT Pub. No.: WO01/22119

PCT Pub. Date: Mar. 29, 2001

(51) Int. Cl.[7] .................................................. G01T 1/17
(52) U.S. Cl. ..................... 702/107; 702/66; 702/78; 330/305; 250/363.01; 250/370.01
(58) Field of Search ................... 702/107, 106, 702/85, 87, 66–71, 75, 76, 78, 40, 124, 126, 159, 172, 189, 198, 190, FOR 107–FOR 110, FOR 156–FOR 164; 250/370.01, 389, 369, 339.07, 339.09, 363.09, 363.01, 370.06, 336.1, 252.1 A, 252.1 R; 327/336, 180, 172, 14, 15, 552, 309, 311; 330/2, 305; 356/300, 326, 306, 307; 324/318, 459, 601, 607, 605, 676, 76.15, 76.17, 76.18, 76.24, 76.25, 76.38; 708/300; 341/110, 155, 167, 168, 120, 122, 129, 134

(56) References Cited

U.S. PATENT DOCUMENTS

| | | | |
|---|---|---|---|
| 4,491,799 A | | 1/1985 | Giardinelli ..................... 330/2 |
| 4,866,400 A | | 9/1989 | Britton, Jr. et al. .......... 330/305 |
| 5,021,664 A | * | 6/1991 | Hinshaw ................. 250/370.01 |
| 5,585,756 A | * | 12/1996 | Wang .......................... 327/336 |
| 5,821,533 A | * | 10/1998 | Bingham et al. ....... 250/370.01 |
| 5,872,363 A | * | 2/1999 | Bingham et al. ....... 250/363.01 |
| 5,912,825 A | * | 6/1999 | Bingham .................... 330/305 |

FOREIGN PATENT DOCUMENTS

WO    WO-01/22119 A1  *  3/2001

* cited by examiner

*Primary Examiner*—Hal Wachsman
(74) *Attorney, Agent, or Firm*—Larson & Larson, P.A.; James E. Larson

(57) ABSTRACT

A spectroscopy system is provided having an automatic pole-zero error correction circuit. A gated integrator of the system integrates a shaped pulse and trailing edge of the shaped pulse for sampling by an analog-to-digital converter. A pair of samples are converted along the slope of each integrated shaped pulse passing through the system. The two samples are compared on a pulse by pulse basis. An algorithm generates a control word for affecting a change in a pole-zero network coupled along a shaping amplifier of the system. In response to the control word, an MDAC of the pole-zero network affects a change in the system to correct the pole-zero error. When the pole-zero error is eliminated or reaches an acceptable user level, the correction circuitry automatically shuts off.

24 Claims, 7 Drawing Sheets

APPARATUS AND METHOD FOR AUTOMATIC CORRECTION OF POLE-ZERO ERROR IN A SPECTROSCOPY SYSTEM

PRIOR APPLICATIONS

This application is a §371 U.S. National Phase application which bases priority on International Application No. PCT/US99/21791, filed Sep. 3, 1999.

GOVERNMENT LICENSE RIGHTS

This invention was made with U.S. Government support under contract or grant DASG60-96-1-0005 awarded by U.S. Army Space and Missile Defense Command. The U.S. Government has certain rights in the invention.

TECHNICAL FIELD

This invention relates to a pole-zero error correction circuit. More particularly, it relates to an automatic pole-zero error correction circuit for use in an ionizing radiation spectroscopy system.

BACKGROUND ART

Spectroscopy systems are used for the measurement and analysis of electromagnetic spectra arising from the emission or absorption of radiant energy. Most radiation spectroscopy systems employ a radiation detector for receiving incident radiation so that a charge, proportional to the incident radiation energy, can be provided. This charge is directed to a charge sensitive preamplifier for forming a voltage pulse exhibiting a fast rise time with a long decay time typically on the order of 5 us–1000 us. Further analog amplification and filtering are performed upon this pulse to provide a properly amplitude scaled pulse with good signal-to-noise characteristics. The filtering, also known as pulse shaping, is typically implemented in the form of active high pass or differentiation filter stages followed by several active low pass filter stages. Collectively, the various stages could be called a pulse shaping network. A typical pulse shaping network forms a pulse having a semi-Guassian shape—one which resembles a bell.

Optimal performance of a spectroscopy system is best realized when the output of the pulse shaping network returns to baseline without extending for a long period of time above or below the baseline. If the output pulse of the pulse shaping network fails to return to baseline, an error is introduced into the system during the measurement of the next pulse which occur randomly in time and amplitude. The difference between the time constants of the preamplifier and high-pass filter stages of the spectroscopy system is the source of the error. Adjustment in the pulse shaping network by some type of pole-zero adjustment means is required to correct this error.

Some correction circuits have been introduced into spectroscopy systems which permit manual adjustment of the error. The device of U.S. Pat. No. 4,491,799 to Giardinelli is used with a manual adjustment system and permits the operator to verify that the proper manual adjustment has been made. In particular, the Giardinelli device employs a pair of LEDs for providing a visual indication of the value and polarity of a boxcar integrator output. If one of the LEDs illuminates, the operator knows that the baseline has either fallen below or has remained above the preferred null point. Manual adjustment is then implemented until both LEDs fail to illuminate indicating that the baseline is at the desired null point. The Giardinelli invention attempts to eliminate the need for reading an oscilloscope, but falls short of providing a system which can provide accurate, let alone automatic pole-zero cancellation. In particular, the Giardinelli invention is a completely analog circuit containing many inherent qualities which contribute to the exact error in which the invention is attempting to eliminate (i.e., phase shifts, time phase anomalies, temperature drifts and component tolerances). Further, there exists no means for calibrating the circuit to compensate for the error introduced by the circuit. Still further, the Giardinelli circuit uses a boxcar integrator for sampling the baseline of each pulse passing through the circuit and for providing an average value for the baseline based on all of the sampled pulses. But, since pulses are random in nature, in time and frequency, sample averaging is at best an approximation of the conditions passing through the circuit and do not represent truly ideal conditions needed for an accurate spectroscopy system. Essentially, low count scenarios will result in inaccurate results when using the Giardinelli device. Yet still further, the Giardinelli device requires an operator to make a manual adjustment, through the use of a potentiometer, to achieve proper compensation. Operator error also contributes to inaccurate results.

U.S. Pat. No. 4,866,400 to Britton et al. discloses an automatic pole-zero adjustment circuit for use in ionizing radiation spectroscopy systems and represents an improvement over circuits then known in the prior art such as the Giardinelli device. However, as will be discussed, the invention shown therein still fails to provide a pole-zero cancellation circuit which can accomplish its function without the use of un-needed additional components, as well as being a circuit which relies on pulse sample averaging for determining whether the baseline has returned to the desired null point. The Britton device uses an analog averager to form an average value of the over or under-shoot of a plurality of pulses. Thereafter, the ADC samples this averaged value. Once a plurality of pulses have passed therethrough, the value representing the average amplitude, outputted from the ADC, is directed to a control circuit which affects a command upon a pole-zero network coupled to the system. Unfortunately, such as discussed in Giardinelli, sample averaging is inherently deficient in that it does not represent true real time dynamic sampling. Britton also uses the additional analog-to-digital converter (above what is normally needed in a spectroscopy system) with the boxcar averager in its control circuitry, thereby dissipating additional power, as well as adding further cost and complexity to the circuit. Further, the Britton control circuitry is relying on a single average value of the sampled pulses and is not configured to accept and process continuous individual values passing through its circuitry. Accordingly, it is configured only to output a single control word in response to a single accepted sampled value.

An improved pole-zero error correction device/circuit is needed for use in ionizing radiation spectroscopy systems which can overcome the deficiencies in the prior art. The improved device should eliminate analog averaging and rely on the actual value of each sampled pulse (a pulse-by-pulse basis) for determining the extent of the pole-zero error. Further, the device should eliminate un-needed components which tend to dissipate additional power and impose additional cost and complexity to the system. Finally, the improved pole-zero device should automatically correct the error and then shutdown once the error has been corrected.

DISCLOSURE OF INVENTION

We have invented an improved pole-zero error correction circuit and method for correcting pole-zero error in an ionizing radiation spectroscopy system. Our circuit overcomes the deficiencies seen in the prior art and represents a major improvement to that which is known by those skilled in the art.

An automatic pole-zero error correction circuit couples to an ionizing radiation spectroscopy system. The circuit includes a pole-zero network coupled to the spectroscopy system as part of a larger feedback control system. The pole-zero network has a characteristic which varies in response to an input control signal received from a pole-zero compensation circuit. The pole-zero network performs an adjustment to the spectroscopy system to correct the pole-zero error within the spectroscopy system. A gated integrator extends the shaped pulses for a set duration permitting two samples to be converted by an analog-to-digital converter (ADC) along the slope of each integrated pulse passing through the spectroscopy system. The two conversion results taken from each pulse are directed to the pole-zero compensation circuit for generation of an appropriate correction signal for subsequent injection upon the pole-zero network. The correction signal is a digital algorithm representing a digital correction factor outputted from a digital controller of the pole-zero compensation circuit.

The novel approach of correcting pole-zero error within a spectroscopy systems, as seen herein, provides a much higher degree of accuracy for correction of the pole-zero error over those circuits, devices and methods known in the prior art. In particular, the present device can achieve superior results over those devices utilizing boxcar averaging, a method of analog sampling known to be susceptible to errors especially when the repetition rate of the pulses is low. Further, the device of the present invention, taking two samples along the trailing edge of the extended pulse waveform, is actually measuring the area of the pulse and not the amplitude, a method of measuring for pole-zero error not seen hereto before. The device of the present invention also utilizes a reduced component count which dissipates less power, saves space and reduces cost of manufacturing. Reduced component count, as compared to those systems in the prior art, is realized through the novel use of components already provided in the spectroscopy system.

BRIEF DESCRIPTION OF DRAWINGS

The invention may be best understood by those having ordinary skill in the art by reference to the following detailed description when considered in conjunction with the accompanying drawings in which.

BEST MODE FOR CARRYING OUT THE INVENTION

Figure 1:
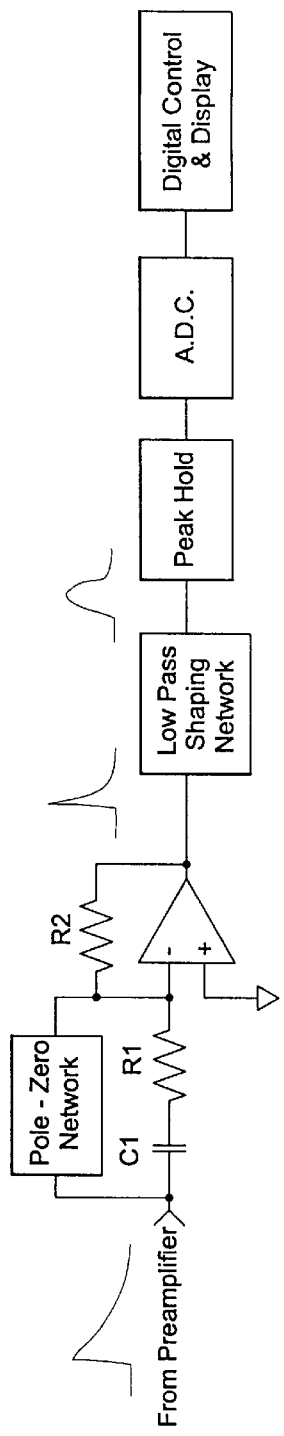
FIG. 1 is a block diagram of a first prior art spectroscopy system capable of affecting manual pole-zero error correction.

Referring to FIG. 1, a first prior art spectroscopy system is shown. The first prior art system employs a peak hold stage coupled directly to an analog-to-digital converter (ADC) stage for measuring the amplitude of a shaped pulse passing through the system. By using a display apparatus, such as an oscilloscope or a pair of LEDs (as in the Giardinelli reference), a determination can then be made whether any pole-zero error exists in the system. Thereafter, manual adjustment can be made to the system through manipulation of the pole-zero network coupled to the system. Manual adjustment in this first prior art system could be affected by a potentiometer, for example.

Figure 2:
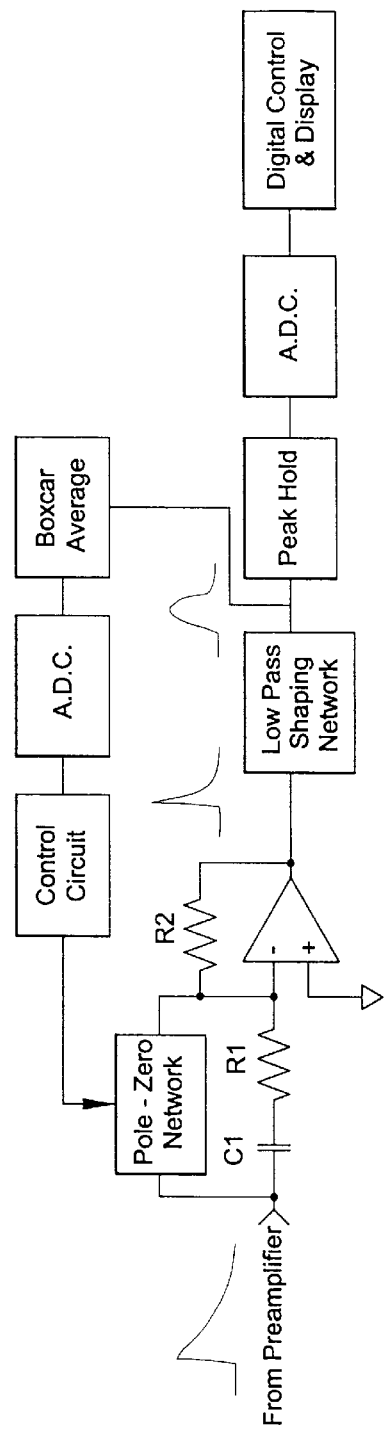
FIG. 2 is a block diagram of a second prior art spectroscopy system, similar to that of FIG. 1, capable of affecting automatic pole-zero error correction through the use of added circuitry.

Referring to FIG. 2, a second prior art spectroscopy system is shown. The second prior art system employs similar components as in the first prior art system with the addition of an analog boxcar averager, an second ADC and a control circuit. These additional components are coupled to this second prior art system for affecting an automatic pole-zero error correction. However, these components add complexity and cost to the system, require additional space within the system and dissipate additional power.

Figure 3:
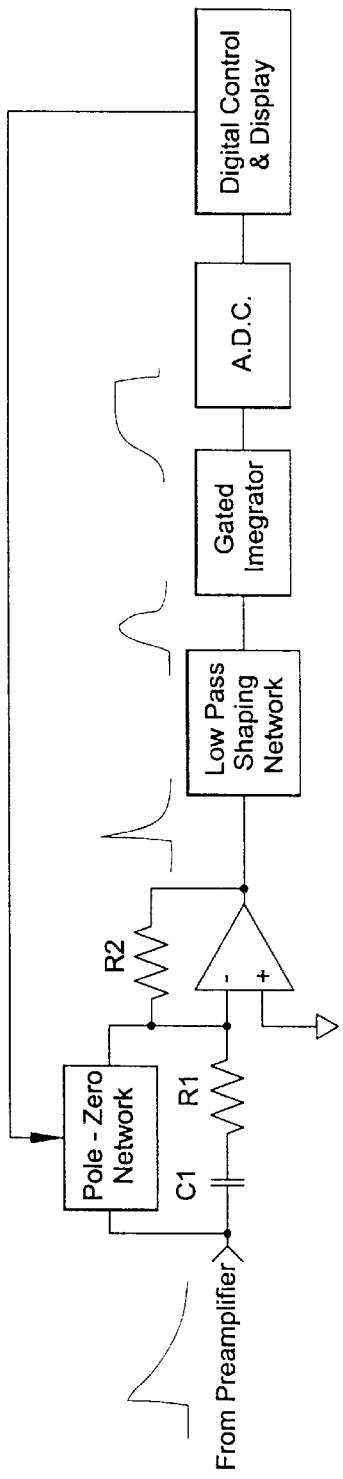
FIG. 3 is a block diagram of a novel spectroscopy system of the present invention capable of affecting automatic pole-zero error correction without the need for additional control circuitry.

Referring to FIG. 3, a novel spectroscopy system of the present invention is shown. The novel system employs a dual purpose gated integrator. Purpose number 1 replaces the peak hold circuit of the two prior art systems shown in FIGS. 1 and 2 respectively. Accordingly, purpose number 1 for the gated integrator, used in conjunction with an ADC, measures the area of the shaped pulses passing through the system. Purpose number 2, a use not seen in the prior art, assists in measuring the extent of the pole-zero error. This is accomplished by extending the output waveform emanating from the gated integrator for subsequent sampling by the ADC. The ADC coupled to the gated integrator samples the extended waveform slope twice. Depending on whether the value of the first sample is greater or less than the value of the second sample, an algorithm, generated by a digital controller located within the digital control & display stage, is applied to the pole-zero network for cancellation of the pole-zero error.

Figure 4:
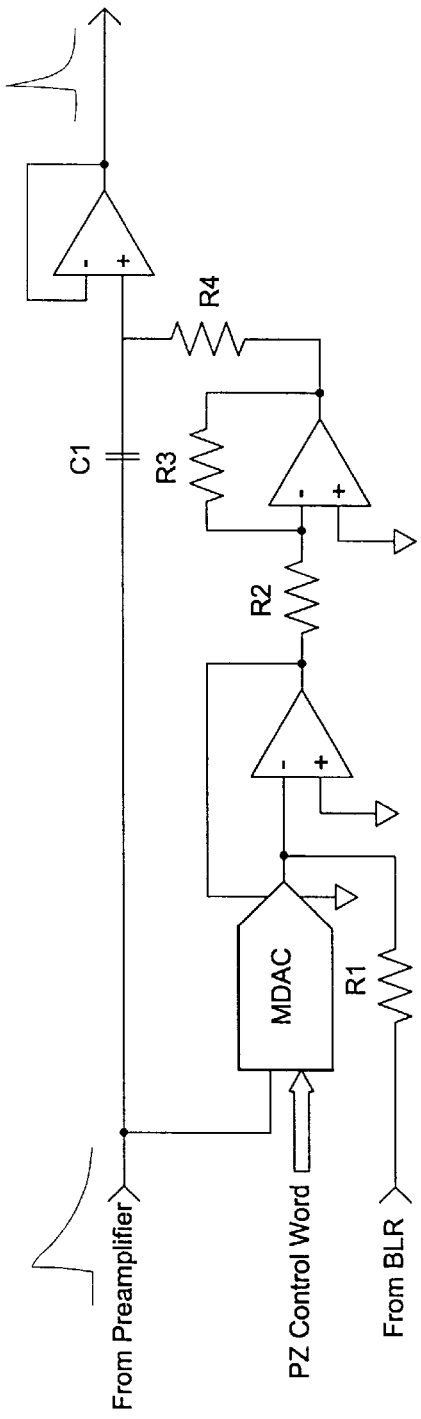
FIG. 4 is a schematic diagram of the circuitry used in the pole-zero network of the novel spectroscopy system of the present invention.

Referring to FIG. 4, a pole-zero network, employed in the novel spectroscopy system of the present invention is shown. The pole-zero network contains, inter alia, a multiplying digital-to-analog converter (MDAC). The MDAC receives a "PZ Control Word" (see FIG. 4) which is generated by an algorithm. Referring to FIG. 3, the pole-zero network shown in FIG. 4 is coupled to the spectroscopy system along a high-pass shaping network between the preamplifier and low-pass shaping network stages.

Figure 5:
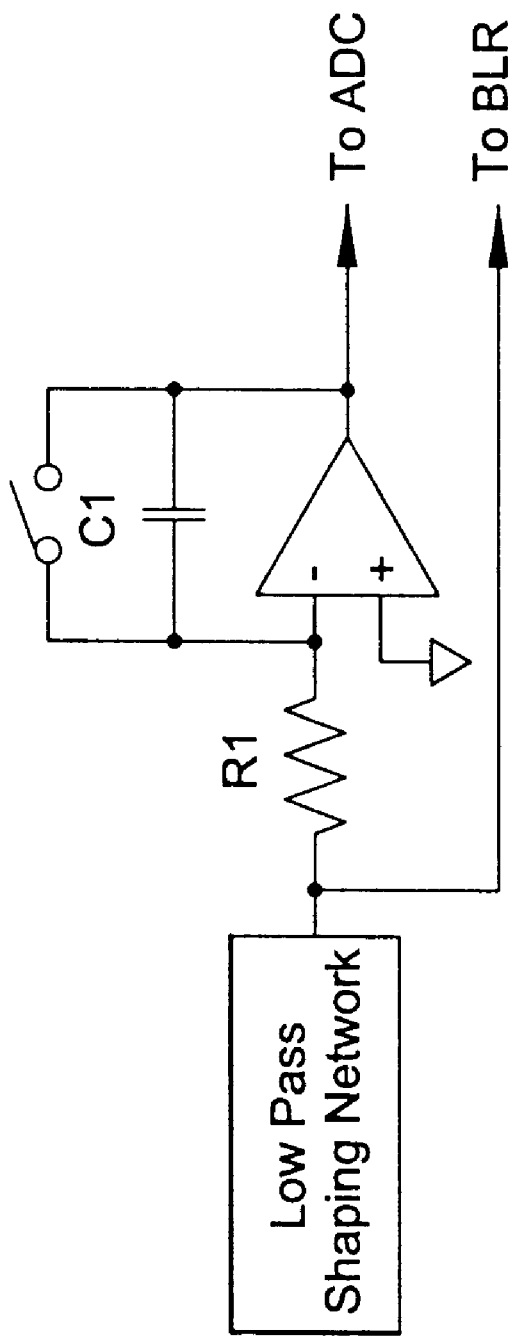
FIG. 5 is a schematic diagram of the circuitry used in the gated integrator of the novel spectroscopy system of the present invention.

Referring to FIG. 5, a schematic diagram is shown depicting the circuitry used in the gated integrator of the novel spectroscopy system of the present invention. Accordingly, the resistor R1, capacitor C1, op-amp and switch shown in FIG. 5 is included in the box labeled "gated integrator" on FIG. 3.

In a preferred method of operation, the pole-zero cancellation procedure follows "simple implementation" wherein the PZ Control Word directs the pole-zero network to increment or decrement, depending on any difference in voltage level of the two samples, by a value of 1. In an alternate method of operation, the pole-zero cancellation procedure follows "proportional integral implementation" wherein the PZ Control Word directs the pole-zero network to increment or decrement, again depending on any difference in voltage level of the two samples, by a varying value proportional to the amount of difference between the two samples. This procedure is based on PID or "proportional integral derivative." In yet another method of operation, a "binary search implementation" can be employed for reducing the number of samples needed to correct the pole-zero error to an acceptable level. Each of the above three implementation procedures will be more fully discussed later hereinafter, with reference to FIGS. 6–8.

Regardless of the implementation procedure used, and so long as the pole-zero correction circuitry is activated, the novel system of FIG. 3 measures the pole-zero error then occurring in the spectroscopy system after each pulse. Accordingly, new PZ Control Words are constantly being generated by the digital controller and directed to the pole-zero network after each pulse. The novel system of FIG. 3 will continue to generate PZ Control Words until the pole-zero error is eliminated (i.e., the value of the two samples are equal). Thereafter, the pole-zero error cancellation circuitry automatically shut-downs.

Figure 9:
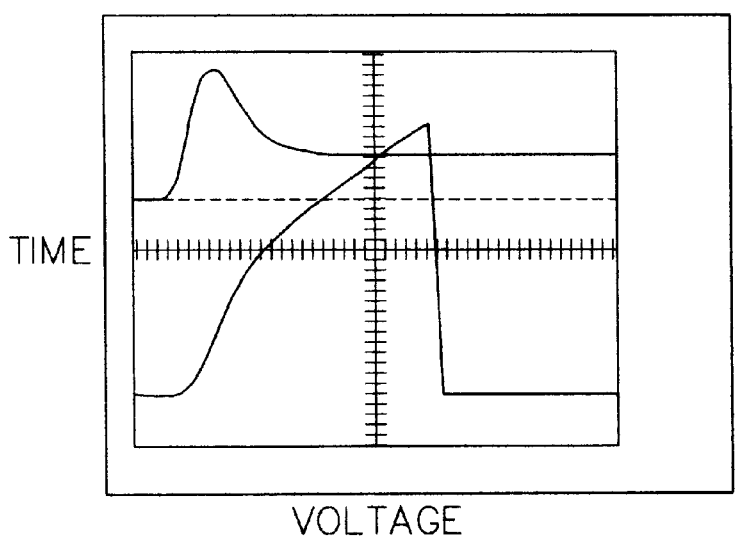
FIG. 9 is a representation of an oscilloscope output depicting a pulse with over-compensated pole-zero cancellation.
Figure 10:
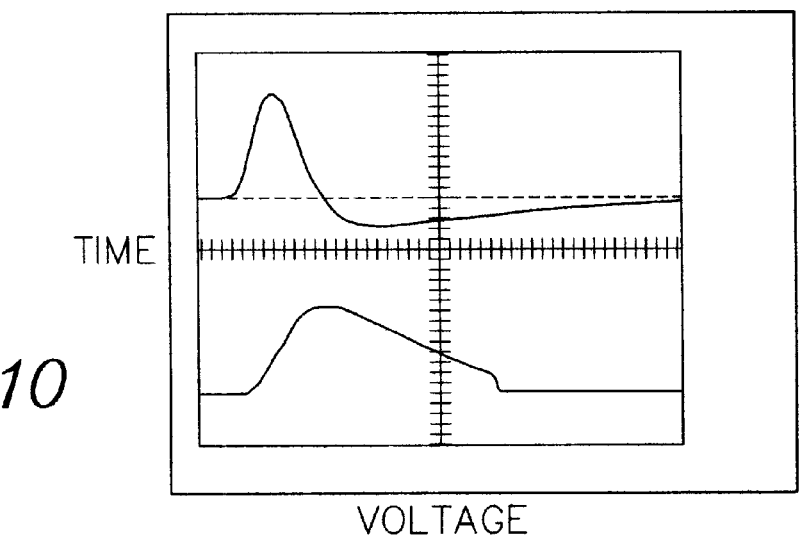
FIG. 10 is a representation of an oscilloscope output depicting a pulse with under-compensated pole-zero cancellation.
Figure 11:
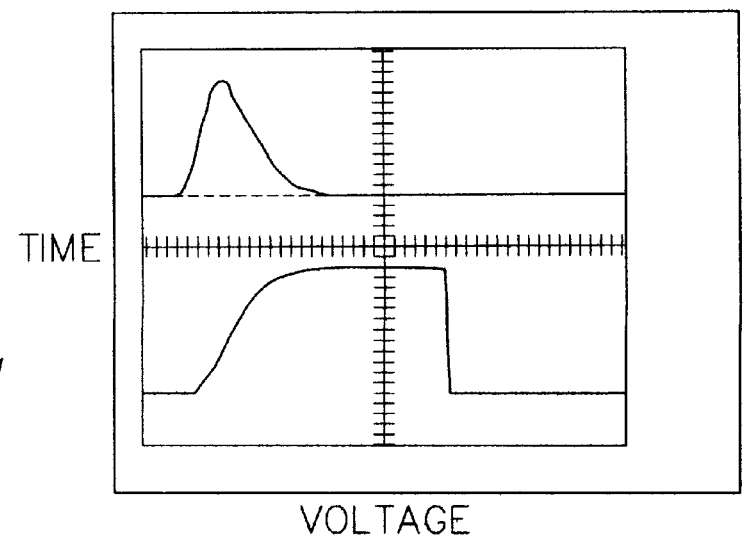
FIG. 11 is a representation of an oscilloscope output depicting a pulse with correct pole-zero cancellation.

Referring to FIGS. 9–11, oscilloscope display representations are depicted showing waveforms relating to pole-zero error. The broken line in all three figures represents the proper baseline. FIG. 9 represents an over-compensated pole-zero canceled waveform. Hence, if two samples are taken along the trailing edge of the semi-Gaussian shaped pulse (the upper waveform), the second sample would have a lesser value than the first sample (i.e., the baseline is positive). FIG. 10 represents an under-compensated pole-zero canceled waveform. Here, if two samples are taken along the trailing edge of the semi-Gaussian shaped pulse, the second sample would have a greater value than the first sample (i.e., the baseline is negative). FIG. 11 represents a properly compensated pole-zero canceled waveform. Here, if two samples are taken along the trailing edge of the semi-Gaussian shaped pulse, the second sample would have an equal value with that of the first sample (i.e., the baseline has returned to the proper level).

Various novel methods of implementing the pole-zero cancellation procedure can be used with the system of the present invention shown in FIG. 3. Three such methods are shown in FIGS. 6–8, respectively representing: simple implementation, proportional integral implementation and binary search implementation.

Figure 6:
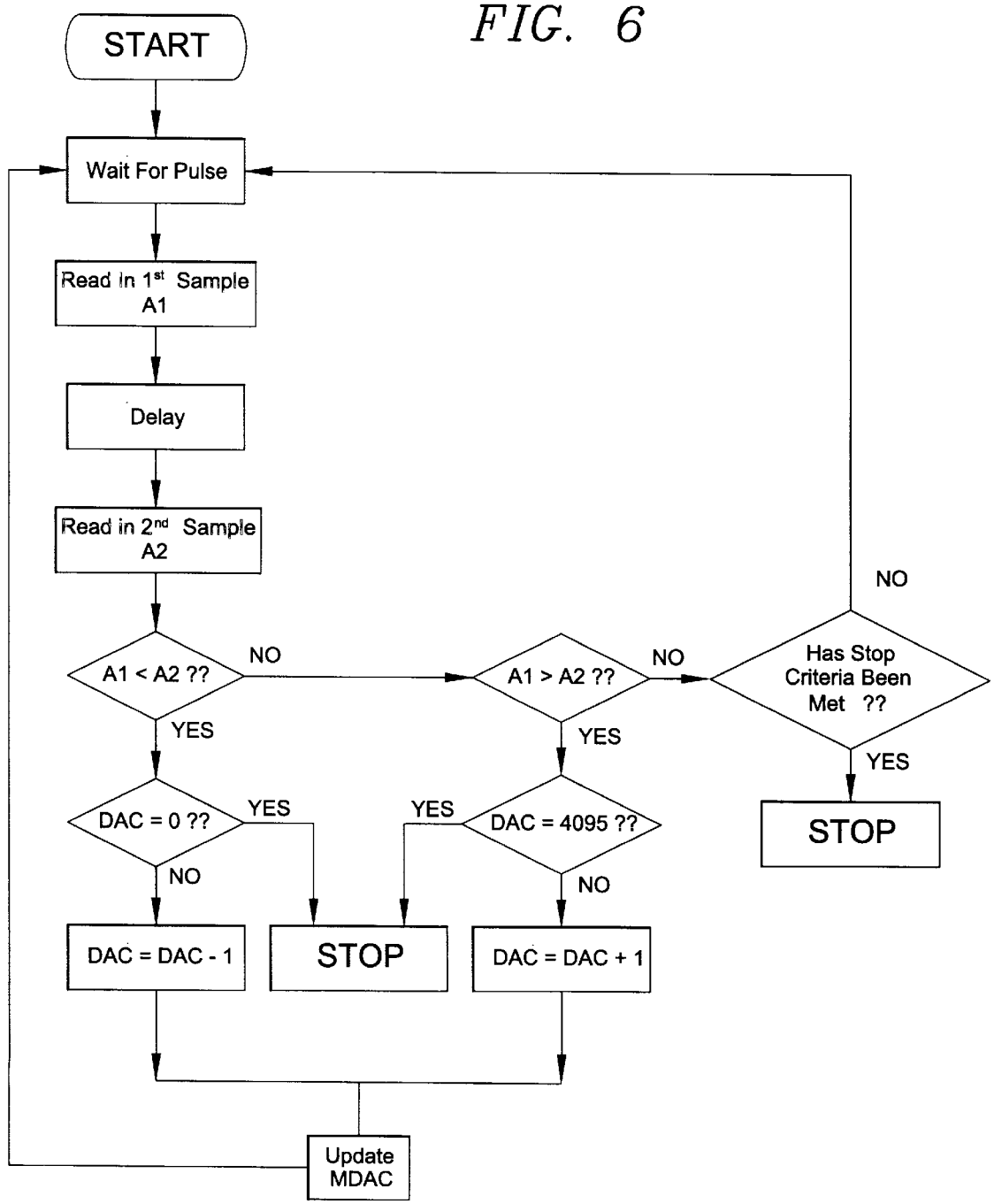
FIG. 6 is a flow diagram of a simple correction implementation carried out by the novel spectroscopy system of the present invention utilizing either a field programmable gate array or a firmware controlled microprocessor.

As shown in FIG. 6, a preferred method of operation is illustrated wherein simple implementation is used to perform the pole-zero cancellation procedure in a spectroscopy system. The logic of this method can be affected by an FPGA (field programmable gated array) or preferably by firmware stored in a microprocessor. In either form, the method is followed in the same manner. In particular, a first sample is read in from the ADC and designated as A1. A short delay of about 5 us is then timed out to allow for the first sample to fully convert. This time delay can be extended to allow for a more accurate reading of the integrator slope if desired. After the delay, a second sample is read in from the ADC and is designated as A2. A query is then made asking whether A1 is less than A2 (A1<A2 ?). If the answer is no, another query is made asking whether A1 is greater than A2 (A1>A2 ?). However, if the answer to "A1<A2 ?" is yes, a different query is made asking whether the DAC equals zero (DAC=0 ?), wherein the DAC is the current PZ Control Word setting (a numeric value between a range dependent upon the bit value of the MDAC, such as, for example, 0–4095 for 12 bit, 0–65535 for 16 bit or 0–1048575 for 20 bit wherein the mathematical equation of $2^n-1$ determines the maximum value and n equals the number of bits). If the answer is yes (DAC=0), then the procedure stops since the PZ Control Word can not be decremented below the value of zero—its minimum value. However, if the answer to "DAC=0 ?" is no, then a new DAC value is set by decrementing the current DAC by one which is expressed by DAC=DAC−1. The MDAC is then updated with the new DAC value. Thereafter, the new DAC value is directed to the beginning of the algorithm for further processing of the next pulse. Returning to an earlier portion of this simple implementation procedure wherein the answer to "A1<A2 ?" was no, it was stated that a second query is made asking whether A1 is greater than A2 (A1>A2 ?). If the answer to this query is no, then the procedure enters a stop sub-procedure (to be discussed hereinafter). However, if the answer to "A1>A2 ?" is yes, then a query is made asking whether the DAC equals 4095 (DAC=4095 ?), wherein again the DAC is the current PZ Control Word setting (the value of 4095 is used in the preferred embodiment since a 12 bit MDAC is being used). If the answer to "DAC=4095 ?" is yes, then the procedure stops since the PZ Control Word can not be incremented above the value of 4095—its maximum value. However, if the answer to "DAC=4095 ?" is no, then a new DAC value is set by incrementing the current DAC by one which is expressed by DAC=DAC+1. The MDAC is then updated with the new DAC value. Thereafter, the new DAC value is directed to the beginning of the algorithm for further processing of the next pulse.

With continuing reference to FIG. 6, a stop sub-routine is implemented if the answer to the query "A1>A2 ?" is no. As shown in FIG. 6, this presumes that the answer to the query is "A1<A2 ?" is also no. In other words, A1 must equal A2 (the desired result of this simple implementation procedure for cancellation of the pole-zero error). However, the stop sub-procedure does not merely take one reading and then stop. Within the stop sub-procedure, a query is made asking whether the stop criteria has been met. If the answer is yes, then the procedure does in fact stop and no more incrementing or decrementing occurs. But, if the answer is no, then the value of the DAC is redirected to the beginning of the algorithm for additional processing. The definition of the stop criteria in the preferred embodiment is whether the last five pulses have resulted in A1=A2 (although the amount of pulses to check can be set to any desired number). Additional variations on the stop criteria include testing the average of the last five pulse two sample differences or verifying that the differences in two samples of each pulse of a series of pulses fluctuate by a very small degree. If the stop criteria has been met (the answer is yes), then procedures leads to an actual stop. The stop sub-routine ensures that a series of pulses passing through the system are consistently yielding equal or nearly equal values for the two samples before the correction circuitry is shut off.

Figure 7:
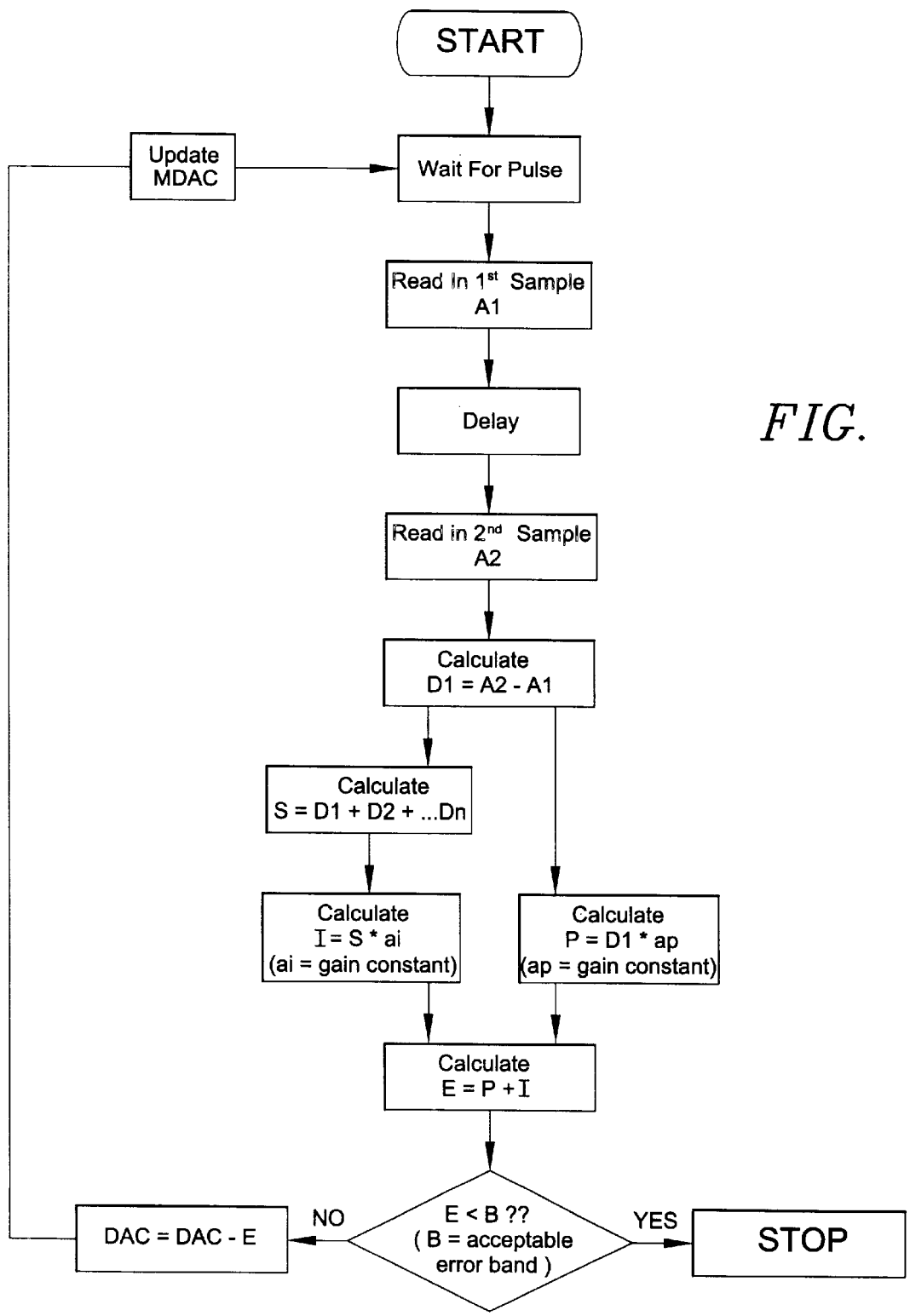
FIG. 7 is a flow diagram of a proportional correction implementation carried out by the novel spectroscopy system of the present invention utilizing a firmware controlled microprocessor.
Figure 8:
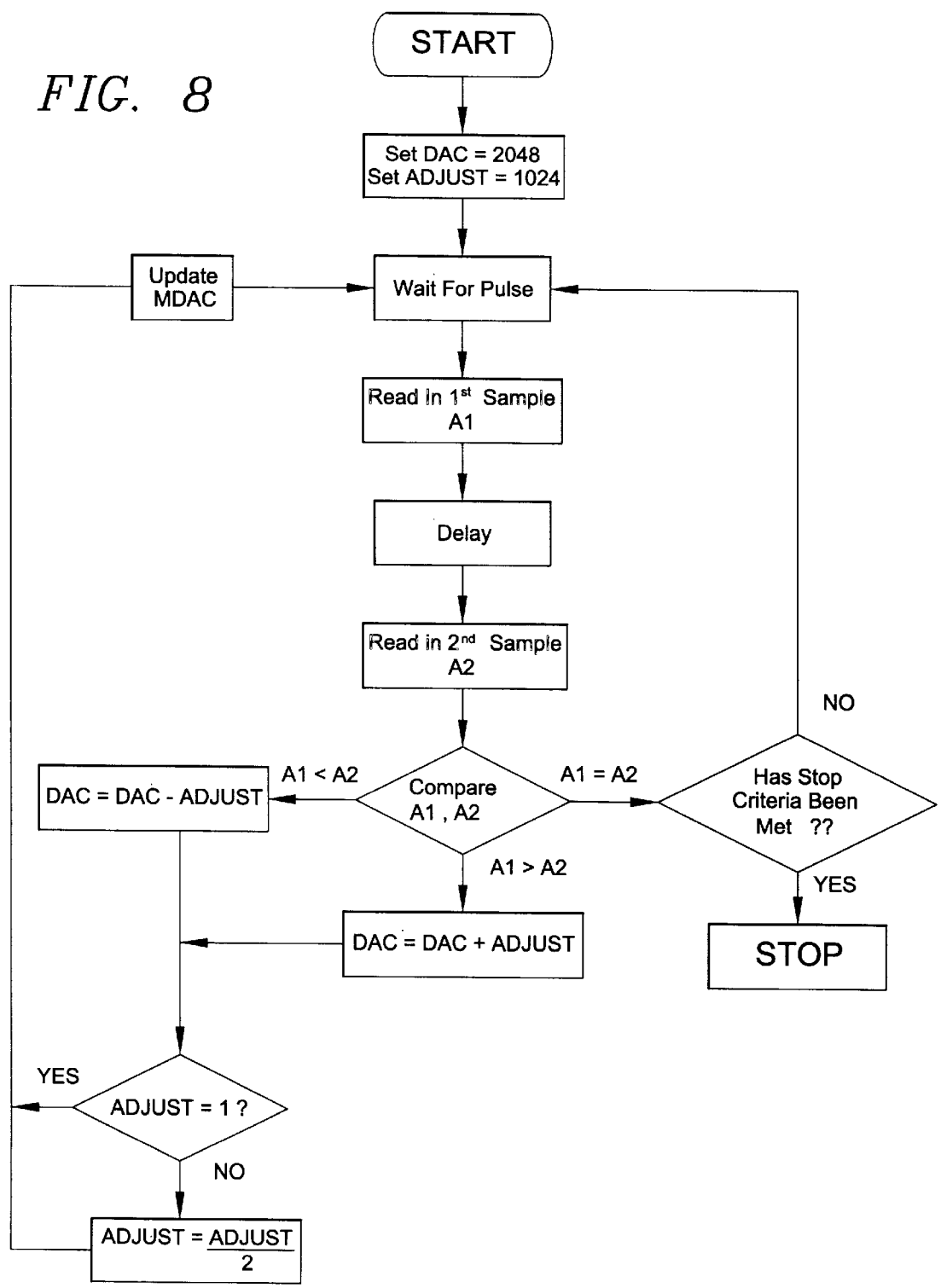
FIG. 8 is a flow diagram of a binary search routine which can be used with the novel spectroscopy system of the present invention to determine and correct the pole-zero error.

With reference to FIG. 7, a proportional integral implementation method is shown for canceling pole-zero error in a spectroscopy system. In such method, a proportional calculation and an integral calculation are simultaneously performed and thereafter summed for establishing a value which is compared to an "acceptable error band" value. If this summed value is less than the acceptable error band, the procedure stops. If not, the DAC is decremented by the summed value and redirected to the beginning of the procedure for further processing. In particular, a pulse is received, sampled a first time by the ADC, read into the proportional integral procedure and given a value represented by A1. A short delay of about 5 us is again timed out to allow for the first sample to fully convert. This time delay could also be extended to allow for a more accurate reading of the integrator slope if desired, just as in the simple implementation. Next, a second sample from the same pulse converted by the ADC is read and given a value represented by A2. D1, the difference in the two samples of the current pulse, is then calculated (D1=A2−A1). At this point, two different pathways are followed—a first pathway calculates an integral value I (a history of the difference) while a second pathway calculates an proportional value P (the current difference). In the integral pathway, S is first calculated by summing D1, D2 and Dn (D1+D2+ . . . Dn) where n equals some finite predetermined number. In the preferred embodiment, n equals six. Thereafter, I is calculated by multiplying S with ai, wherein ai is a predetermined integral gain constant. At the same time, P is calculated by multiplying D1 with ap, wherein ap is a predetermined proportional gain constant and D1 is the difference between the two samples of the current pulse. The two gain constants, ai and ap, are empirically determined, their values based on the MDAC circuit and shaping times employed within the spectroscopy system). Next, E is calculated by summing I and P. The value of E is then compared to B wherein B represents the acceptable error band. A query is made asking whether E is less than B (E<B ?). If the answer is yes, then the procedure stops since E is below the acceptable pole-zero error level. However, if the answer is no, then a new DAC value is calculated by subtracting the value of E from the existing DAC value. The MDAC is then updated with the new DAC value. Thereafter, the new DAC value is directed to the beginning of the algorithm for further processing of the next pulse.

Referring to FIG. 8, a binary search implementation is shown for performing pole-zero cancellation in a spectroscopy system of the present invention. In such procedure, a DAC and ADJUST value are first set according to numeric values relative to the bit value of the MDAC used in the circuit. As noted above, the preferred embodiment uses a 12 bit MDAC. Therefore, the DAC value is set at 2048 (or half of the maximum value) and the ADJUST value is set to 1024 (or half of the preset DAC value). When a pulse passes through the system, a first sample is taken and represented by A1. A short delay of about 5 us is timed out to again allow for the sample to fully convert. As with the other two implementations, this time delay can be extended to provide a more accurate reading of the gated integrator slope. Thereafter, a second sample is taken and represented by A2. Next, A1 and A2 are compared to determine whether A1 is less than greater than or equal to A2. If A1 is equal to A2, then the stop sub-routine is implemented (just as in the simple implementation). If A1 is less than A2 (A1<A2 ?), then a new DAC value is calculated by decrementing the current DAC value by the ADJUST value. If A1 is greater than A2 (A1>A2 ?), then a new DAC value is also calculated, but is instead calculated by incrementing the current DAC value by ADJUST value. Regardless of which path is chosen, subsequent to the calculation of the new DAC value, a query is made asking whether the ADJUST value equals 1—the minimum value for the ADJUST. If the answer is yes, then the new DAC value and ADJUST value of 1 are directed to the beginning of the procedure for further processing. However, if the answer to "ADJUST=1?" is no, then a new ADJUST value is calculated by dividing the current ADJUST value by 2. Thereafter, this new ADJUST value and the new DAC value are directed to the beginning of the procedure for further processing.

Equivalent elements can be substituted for ones set forth above to achieve the same results in the same manner and way. Further, equivalent steps can be substituted for the ones set forth above in the implementation procedures to practice the same method in the manner and thereby achieve the same results.

What is claimed is:

1. An automatic pole-zero error correction circuit for use in an ionizing radiation spectroscopy system having a preamplifier and a high-pass and low-pass shaping network for generating a shaped pulse, the automatic pole-zero error correction circuit comprising:

a) a pole-zero network coupled to the ionizing radiation spectroscopy system along the high-pass shaping network between the preamplifier and low-pass shaping network, b) a gated integrator coupled to the low-pass shaping network for integrating the shaped pulse and a trailing edge of the shaped pulse forming a signal having a slope proportional to the pole-zero error in the ionizing radiation spectroscopy system, c) an analog-to-digital convertor (ADC) coupled to the gated integrator for converting two samples along the slope of the integrated shaped pulse, d) a digital control circuit coupled to the ADC for receiving the two samples converted by the ADC, for comparing the values of the two samples to each other, for generating a control signal in response to the two sample value comparison and for applying the control signal to the pole-zero network, and e) the pole-zero network affecting pole-zero error correction upon the ionizing radiation spectroscopy system in response to receiving the control signals generated and applied by the digital control circuit.

2. The automatic pole-zero error correction circuit of claim 1, wherein the pole-zero network includes a multiplying digital-to-analog converter (MDAC) for receiving the digital control circuit control signal, for storing a numeric value and for affecting the pole-zero error within the ionizing radiation spectroscopy system.

3. The automatic pole-zero error correction circuit of claim 2, wherein the MDAC of the pole-zero network stores a numeric value taken from a numeric value range dependent on a bit-value of the MDAC.

4. The automatic pole-zero error correction circuit of claim 2, wherein the MDAC numeric value is incremented or decremented by a numeric value of one in response to receiving the control signal.

5. The automatic pole-zero error correction circuit of claim 2, wherein the MDAC numeric value is incremented or decremented by an integer value equal to or greater than two in response to receiving the digital control circuit control signal.

6. The automatic pole-zero error correction circuit of claim 1, wherein the digital control circuit employs digital programmable logic.

7. The automatic pole-zero error correction circuit of claim 1, wherein the digital control circuit employs either a microcontroller or a microprocessor.

8. An automatically correcting pole-zero error ionizing radiation spectroscopy system comprising:
   a) a radiation detector providing a charge proportional to energy absorbed from incident radiation subjected to the radiation detector,
   b) a charge sensitive preamplifier coupled to the radiation detector forming a voltage pulse,
   c) a shaping amplifier coupled to the charge sensitive preamplifier having high-pass and low-pass filtering networks forming a shaped pulse from the voltage pulse outputted from the charge sensitive preamplifier,
   d) a pole-zero network coupled along the shaping amplifier affecting pole-zero error correction upon the automatically correcting pole-zero error ionizing radiation spectroscopy system in response to a control signal received from a digital control circuit of the system,
   e) a gated integrator coupled to the shaping amplifier for integrating the shaped pulse and a trailing edge of the shaped pulse forming a signal having a slope proportional to the pole-zero error in the automatically correcting pole-zero error ionizing radiation spectroscopy system,
   f) an analog-to-digital convertor (ADC) coupled to the gated integrator for converting two samples along the slope of the integrated shaped pulse, and
   g) the digital control circuit coupled to the ADC for receiving the two samples converted by the ADC, for comparing the values of the two samples to each other, for generating the control signal in response to the two sample value comparison and for applying the control signal to the pole-zero network.

9. The ionizing radiation spectroscopy system of claim 8, wherein the pole-zero network includes a multiplying digital-to-analog converter (MDAC) for receiving the digital control circuit control signal, for storing a numeric value and for affecting the pole-zero error correction within the ionizing radiation spectroscopy system.

10. The ionizing radiation spectroscopy system of claim 9, wherein the MDAC of the pole-zero network stores a numeric value taken from a numeric value range dependent on a bit-value of the MDAC.

11. The ionizing radiation spectroscopy system of claim 9, wherein the MDAC numeric value is incremented or decremented by an integer value equal to or greater than one in response to receiving the control signal.

12. The ionizing radiation spectroscopy system of claim 8, wherein the digital control circuit employs circuitry chosen from the group consisting of digital programmable logic, a microcontroller and a microprocessor.

13. A method of correcting pole-zero error in a spectroscopy system, the spectroscopy system having pole-zero error correction circuitry including a radiation detector coupled to a charge sensitive preamplifier coupled to a shaping amplifier coupled to a gated integrator coupled to an analog-to-digital converter (ADC) coupled to a digital control circuit, the spectroscopy system having a charge proportional to energy absorbed from incident radiation subjected to the radiation detector which forms a voltage pulse and a shaped pulse, the steps of the method comprising:
   a) providing a pole-zero network coupled along the shaping amplifier of the spectroscopy system,
   b) integrating the shaped pulse and a trailing edge of the shaped pulse in the gated integrator for forming a signal having a slope proportional to the pole-zero error in the spectroscopy system,
   c) converting a first and second sample along the slope of the integrated shaped pulse in the ADC,
   d) comparing values of the first and second sample in the digital control circuit,
   e) generating a control signal in response to the first and second sample value comparison in the digital control circuit,
   f) applying the control signal generated by the digital control circuit in step e) to the pole-zero network, and
   g) affecting a change in the pole-zero error in the spectroscopy system by the pole-zero network.

14. The method of correcting pole-zero error in a spectroscopy system according to claim 13, wherein after the step of affecting a change in the pole-zero error, the method further comprising the steps of:
   h) determining that a level of pole-zero error in the spectroscopy system is acceptable, and
   i) automatically shutting off the pole-zero error correction circuitry.

15. The method of correcting pole-zero error in a spectroscopy system according to claim 13, wherein a multiplying digital-to-analog convertor (MDAC) is employed within the pole-zero network, the MDAC storing a first numeric value taken from a numeric value range dependent on a bit-value of the MDAC, the MDAC numeric value range defining an MDAC minimum and maximum numeric value, a current MDAC numeric value equal to a current DAC numeric value wherein the DAC numeric value is defined as a second numeric value taken from the MDAC numeric value range representing a function of the control signal.

16. The method of correcting pole-zero error in a spectroscopy system according to claim 15, wherein the step of comparing the values of the first and second sample comprises the step of determining whether the value of the first sample is equal to, less than or greater than the value of the second sample.

17. The method of correcting pole-zero error in a spectroscopy system according to claim 16, wherein if a determination is made that the value of the first sample is equal to the value of the second sample, the method further comprising the step of initiating a stop sub-routine.

18. The method of correcting pole-zero error in a spectroscopy system according to claim 16, wherein if a determination is made that the value of the first sample is less than the value of the second sample, the method further comprising the steps of:
   a) establishing a new DAC numeric value by decrementing the current DAC numeric value if the current DAC numeric value is greater than the MDAC minimum numeric value, and
   b) updating the current MDAC numeric value to be equal to the new DAC numeric value.

19. The method of correcting pole-zero error in a spectroscopy system according to claim 16, wherein if a determination is made that the value of the first sample is greater than the value of the second sample, the method further comprising the steps of:

a) establishing a new DAC numeric value by incrementing the current DAC numeric value if the current DAC numeric value is less than the MDAC maximum numeric value, and b) updating the current MDAC numeric value to be equal to the new DAC numeric value.

20. The method of correcting pole-zero error in a spectroscopy system according to claim 16, wherein prior to the step of comparing the values of the first and second sample, the method further comprising the steps of:

a) setting the current DAC numeric value to the next integer value up from one-half the MDAC maximum numeric value, and b) setting a current adjust numeric value to one-half of the current DAC numeric value.

21. The method of correcting pole-zero error in a spectroscopy system according to claim 20, wherein if a determination is made that the value of the first sample is less than the value of the second sample, the method further comprising the steps of:

a) establishing a new DAC numeric value by decrementing the current DAC numeric value by the current adjust numeric value, b) establishing a new adjust numeric value by dividing the current adjust numeric value in half if the current adjust numeric value is greater than one, and c) updating the current MDAC numeric value to be equal to the new DAC numeric value.

22. The method of correcting pole-zero error in a spectroscopy system according to claim 20, wherein if a determination is made that the value of the first sample is greater than the value of the second sample, the method further comprising the steps of:

a) establishing a new DAC numeric value by incrementing the current DAC numeric value by the current adjust numeric value, b) establishing a new adjust numeric value by dividing the current adjust numeric value in half if the current adjust numeric value is greater than one, and c) updating the current MDAC numeric value to be equal to the new DAC numeric value.

23. The method of correcting pole-zero error in a spectroscopy system according to claim 15, wherein the step of comparing the values of the first and second samples comprises the steps of:

a) calculating a difference between the second and first sample for a plurality of pulses for rendering a sequence of differences, b) calculating a value S by summing the sequence of differences, c) calculating a value I by multiplying the value S by a predetermined gain constant value ai, d) calculating a value P by multiplying a most recent difference between the second and first sample of the sequence of differences by a predetermined gain constant ap, e) calculating a value E by summing the value P with the value I, and f) comparing the value E with a value B wherein the value B is a predetermined acceptable error band.

24. The method of correcting pole-zero error in a spectroscopy system according to claim 23, wherein if a determination is made that the value of E is greater than the value of B, the method further comprising the steps of:

a) establishing a new DAC numeric value by decrementing the current DAC numeric value by the value of E, and b) updating the current MDAC numeric value to be equal to the new DAC numeric value.

* * * * *